(12) United States Patent
König et al.

(10) Patent No.: US 11,667,240 B2
(45) Date of Patent: Jun. 6, 2023

(54) MODULE SYSTEM AND REAR VIEW DEVICE AS WELL AS MOTOR VEHICLE WITH SUCH A MODULE SYSTEM

(71) Applicant: MOTHERSON INNOVATIONS COMPANY LIMITED, London (GB)

(72) Inventors: Andrea König, Stuttgart (DE); Alexandru Dobrete, Stuttgart (DE); Peter Hein, Stuttgart (DE); Ilka Rötzer, Denkendorf (DE)

(73) Assignee: Motherson Innovations Company Limited, London (GB)

( * ) Notice: Subject to any disclaimer, the term of this patent is extended or adjusted under 35 U.S.C. 154(b) by 223 days.

(21) Appl. No.: 16/647,302

(22) PCT Filed: Aug. 17, 2018

(86) PCT No.: PCT/EP2018/072323
§ 371 (c)(1),
(2) Date: Mar. 13, 2020

(87) PCT Pub. No.: WO2019/052772
PCT Pub. Date: Mar. 21, 2019

(65) Prior Publication Data
US 2020/0398759 A1     Dec. 24, 2020

(30) Foreign Application Priority Data
Sep. 14, 2017  (DE) .................. 10 2017 121 380.5

(51) Int. Cl.
*B60R 1/12* (2006.01)
*B60R 11/04* (2006.01)
(Continued)

(52) U.S. Cl.
CPC ............ *B60R 1/1207* (2013.01); *B60R 11/04* (2013.01); *B60Q 1/2665* (2013.01); *B60R 1/06* (2013.01);
(Continued)

(58) Field of Classification Search
CPC ............. B60R 1/00; B60R 1/06; B60R 1/066; B60R 1/072; B60R 1/12; B60R 2001/1253;
(Continued)

(56) References Cited

U.S. PATENT DOCUMENTS 10,315,578 B2 * 6/2019 Kim ...................... B60R 11/04
2003/0031023 A1  2/2003 Hutzel
(Continued)

FOREIGN PATENT DOCUMENTS

CN      104786946 A      7/2015
DE    102014208417 A1    11/2015
(Continued)

OTHER PUBLICATIONS

International Search Report dated Oct. 17, 2018 of International application No. PCT/EP2018/072323.
(Continued)

*Primary Examiner* — Nathnael Aynalem
(74) *Attorney, Agent, or Firm* — Jones Day

(57) ABSTRACT

A module system for a motor vehicle includes at least one camera pod adapted to be mounted to the motor vehicle at least temporarily extending to the outside and/or from an exterior surface, with said camera pod including at least one camera and at least one port for fitting at least one modular peripheral device and/or adapter of a peripheral device; and at least one interface module adapted to be mounted to the motor vehicle at least temporarily extending into the inside and/or being accessible from the inside, with the interface module being electrically connected to the at least one
(Continued)

camera pod. A rear view device and a motor vehicle include the at least one module system.

14 Claims, 5 Drawing Sheets

(51) Int. Cl.
*B60Q 1/26* (2006.01)
*B60R 1/06* (2006.01)

(52) U.S. Cl.
CPC ............... *B60R 2001/1223* (2013.01); *B60R 2001/1253* (2013.01)

(58) Field of Classification Search
CPC ........... B60R 1/07; B60R 1/074; B60R 1/076; B60R 1/1207; B60R 11/04; B60R 2300/10; B60R 2300/306; B60R 2300/8026; B60R 2300/8046; B60R 2300/8066; B60R 2300/802; B60R 2001/1223; B60R 2011/004; H04N 5/2252; B60Q 1/2665; B60Q 1/2661
USPC ......................................................... 348/148
See application file for complete search history.

(56) References Cited

U.S. PATENT DOCUMENTS

| 2004/0121820 | A1* | 6/2004 | Unno ....................... B60R 1/06 |
| | | | 455/569.2 |
| 2014/0285666 | A1* | 9/2014 | O'Connell ................ B60R 1/12 |
| | | | 348/148 |
| 2016/0214536 | A1* | 7/2016 | Burdge ................... B60R 11/04 |
| 2017/0120841 | A1* | 5/2017 | Knoblock ................. B60R 1/00 |
| 2018/0354422 | A1* | 12/2018 | Hottmann ............... B60R 11/04 |
| 2020/0398755 | A1* | 12/2020 | Lettis .................... H04N 5/2257 |

FOREIGN PATENT DOCUMENTS

| DE | 102015206453 A1 | 10/2016 |
| JP | 2007 137286 A | 6/2007 |

OTHER PUBLICATIONS

Written Opinion dated Oct. 17, 2018 of International application No. PCT/EP2018/072323.

* cited by examiner

MODULE SYSTEM AND REAR VIEW DEVICE AS WELL AS MOTOR VEHICLE WITH SUCH A MODULE SYSTEM

CROSS-REFERENCE TO RELATED APPLICATIONS

This application is a National Stage Entry of International Patent Application No. PCT/EP2018/072323, filed Aug. 17, 2018, which claims the benefit of foreign priority to German Patent Application No. DE 10 2017 121 380.5, filed Sep. 14, 2017, each of which is hereby incorporated by reference in its entirety for all purposes.

BACKGROUND

1. Field of the Invention

The present disclosure relates to a module system for a motor vehicle. The present disclosure further relates to a rear view device and a motor vehicle with such a module system.

2. Related Art

Modern motor vehicles are fitted with an increasing amount of peripheral devices, such as external cameras, sensors, electronic toll payment systems and the like. Many of these devices need to be mounted on the outside of the car and are, for this reason, usually irremovably integrated into outside parts of the vehicle such as rear view mirrors. This makes it necessary to select the desired devices at the time of purchase of a vehicle. In addition, removal or reconfiguration of such devices is difficult and in many cases not possible at all. Furthermore, the customer is often limited to specific selections and/or combinations of devices as offered by the specific manufacturer.

The term "rear view" is here defined as a view of the surrounding area, which is not in the field of view of a driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

Different functions and devices can be incorporated into and/or controlled with the help of rear view devices. Of particular interest are functions and devices to enhance, extend and/or sustain the functionality of the rear view device during normal or extreme conditions. This can comprise heating and/or cooling means, cleaning means such as wipers, liquid and/or gaseous sprays, actuator means for moving the rear view device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore it can comprise linear tracks and/or rotating wheels, like for example a filter wheel, for exchanging optical elements, comprising for example lenses, mirrors, light sources, sensors, adaptive optics like deformable mirrors and/or filters.

Prominent examples for functions and devices incorporated into and/or controlled with the help of rear view devices comprise illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices can comprise for example a tiredness detection system, a micro-sleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A camera module to be used in a rear view device can comprise a plurality of different optical elements, a.o. a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3. Further, the camera can comprise for example CCD or CMOS or light field sensors, as for example described in German patent application No. 102011053999. Also an area of the sensor can be reserved for different purposes, for example to detect a test beam, as described in U.S. Pat. No. 8,031,224. The camera module can also be equipped with apparatuses for light intensity adjustment as described for example in U.S. patent application Ser. No. 14/809,509 and light level intensifier tubes as described in U.S. patent application Ser. No. 09/771,140. Still further, the camera module or a cover adapted to the camera module can be moved using different actuators, drives and/or a flexible track, as for example described in German application No. 102016108247.3.

The camera module can also comprise cleaning elements to clean the optical element facing outwards and being exposed to the environment. The cleaning element can for example comprise wipers, brushes, lips, nozzles, fans and similar elements as are described in European patent application No. 14165197.6, European patent application No. 13163677.1, and European patent No. 1673260. The cleaning devices are not limited in composition, and may for example comprise any fabric, elastomeric, sponge, brush, or combination of these. Special wiper elements comprising wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224. Also light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0.

A watertight seal against weather effects, as well as against the influence of washing processes with detergents, solvents and high pressure cleaners can be used on the housing of the camera module as described in U.S. patent application Ser. No. 13/090,127. Alternatively, the housing can be made of a body comprising plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as for example the snap-fit connection described in European patent No. 2233360.

Shape memory alloys (SMA) are used for various functions with rear view devices. European patent application No. 3098444 relates to an actuator device for a rear view device of a motor vehicle comprising: at least one retaining element; at least one adjusting element which can be transferred into a plurality of functional positions, in particular from a basic position into at least one end position; at least one driving means which comprises at least one shape-memory element which is, in particular, in the form of a wire, which extends between the retaining element and the adjusting element and can be or is secured to both, where the extension of said shape-memory element can be modified on being actuated, in particular on being electrically energized, and by means of the modification of the extension of which the at least one adjusting element can be transferred from one functional position into another functional position, in particular from the basic position into the end position or vice versa; at least one heat-conducting means which lies in contact with the driving means at least in the end position of the adjusting element; and wherein at least one switching means, by means of which the at least one driving means and the at least one heat-conducting means can be or are arranged with respect to one another with no contact in the basic position of the adjusting element and/or by means of which the at least one driving means and the at least one heat-conducting means can be or are arranged touching one another at least in sections at least in the end position of the adjusting element. A further actuator for an exterior rear view mirror of a vehicle is known from European patent application No. 2781743 and has at least one actuator pin, at least one drum body enclosing a cavity, in which the actuator pin can be arranged or is arranged in a non-rotational manner, at least one clamping means which comprises at least one shape-memory element which can be fixed or is fixed to the drum body and with which the drum body can be moved in a first rotational direction, and at least one return means which comprises at least one shape-memory element which can be fixed or is fixed to the drum body and with which the drum body can be moved in a second rotational direction, characterized in that the clamping means and/or the return means can be fixed or are fixed on a winding portion of the drum body and in the winding portion of the drum body at least quarter of a winding, in particular at least half a winding, in particular an entire winding, in particular several windings are applied.

US 2016/0057324 A1 describes a monitoring system for a motor vehicle, comprising at least one camera device which includes a cylindrical lens holder having at least one lens; at least one lighting element configured as an infrared radiator; and at least one plug-on module which includes a plate-shaped bearer on which the at least one lighting element is situated, wherein the at least one plug-on modules is configured to be plugged onto the lens holder. The bearer has at least one opening for accepting the lens holder. The at least one opening has a cross-section corresponding at least substantially to the cross-section of the lens holder, or the lens holder has a jacket outer surface which is conical at least in selected segments, or the at least one lens holder and the bearer has an element for orienting the bearer relative to the lens holder, or at least one connecting plug for the electrical contacting of the camera device is provided on the bearer. The known monitoring system has a complicated structure.

SUMMARY

In an aspect, a motor vehicle includes at least one camera pod adapted to be mounted to the motor vehicle at least temporarily extending to the outside and/or from an exterior surface of the motor vehicle, with said camera pod including at least one camera and at least one port for fitting at least one modular peripheral device and/or adapter of a peripheral device; and at least one interface module adapted to be mounted to the motor vehicle at least temporarily extending into the inside of the motor vehicle and/or being accessible from the inside of the motor vehicle, with the interface module being electrically connected to the at least one camera pod.

Such a module system allows for the free selection, configuration and exchange of peripheral devices, which are more or less accessories freely selectable not only when configurating a new vehicle but during the whole life time thereof. Consequently, the owner of a motor vehicle with such a module system is not limited to fixed configurations and combinations of peripherals as offered by a car manufacturer. Moreover, peripheral device can be easily removed from such a system, for example to transfer them between different cars. The interface module allows access to and control of any peripheral device mounted on the camera pod.

In a preferred embodiment of the invention, each port is adapted to receive one peripheral device or adapter, with a connecting mechanism for mechanically, electrically and/or inductively connecting the peripheral device or adapter to the camera pod, preferably in a lockable and/or sealed manner. A plurality of peripheral devices and/or adapters can be provided with a standardized modular structure. Still further, each peripheral device can be selected from a group comprising a microphone, a taxi free lamp, a parking light, a parking disc, a device for providing electronic parking tickets, an automatic toll payment, a logo lamp, a fog light, an acceleration light, a flash light, a navigation light, a position light, an emergency light, an approach light, a display, a blind spot light, a warning light, a weather light, a lane change light, a fuel status light, a battery charging light, a puddle light, a brake light, a side turn indicator light, a spot light, a search light, a welcome/goodbye lamp, a laser, a laser scanner, a projector, an ultrasound sensor, an electronic payment device, an electronic registration device, an antenna, a camera, a bird view camera, a front view camera, a rear view camera, a smart phone, a tablet, a smart phone multi interface adapter, a protective glass in particular in different colors, a module housing, in particular a lighted module housing, an anti-marten protection system, a dynamic TLS (transport layer security) adapter, a scan device, self-park assist device, an adapter to an external power source and/or an alarm device. This allows for functional as well as aesthetic configurations of the module system adapted to the preferences of a user, in particular driver of the motor vehicle making usage of the module system of the invention. A scan technology in the camera pod can provide an easy pay option for drive through fast food outlets, toll booths and via apps. A self-park assist technology allows for maneuvering the vehicle driverless into tight spaces i.e. garages.

The invention also proposes embodiments wherein the connecting mechanism comprises at least one mechanical connecting element, in particular selected from a group comprising a bayonet mount, a notch connector, a magnetic connector, a dovetail joint, a snap connection element, a pin and/or a bolt connector, a screw connector and/or a spring connector, a latching element and/or an undercut. The connecting mechanism can comprise at least one locking element, in particular selected from a group comprising a mechanical lock, a fingerprint actuated lock, an iris scanner actuated lock, a code lock, a voice recognition lock, a smart lock, a key lock, a snap lock, an actuator driven lock, a SMA (shape memory alloy), a SMA actuator lock and/or an electrical actuator lock. This allows for an easy mechanical connection of each peripheral device and for providing electrical power as well as electrical control signals to the device.

Each mechanical connecting element allows for mechanically securing a peripheral device to the camera pod and secures its correct positioning. In addition, the locking mechanism prevents the peripheral device from accidental removal and theft. The locking mechanism can be integrated with the motor vehicle's general locking mechanism, such as a central locking system, or use the same key or smart key system as the car to improve the ease of use. The mechanical locking element advantageously translates the action of e.g. a key or one of the above-mentioned electronic locking or authentication systems into the actual physical locking and unlocking action and thus provides the desired physical security for the modular peripheral device.

It is preferred that the connection mechanism is standardized. For example, a standardized modular peripheral device can easily connect to a bus system of the motor vehicle such as a CAN-bus, a LIN-bus, a FLEXRAY-bus or a MOST-bus.

The interface module can be mounted on an interior surface of the motor vehicle, and/or the interface module can be connected to the camera pod, in particular via at least one cable. There can be a plurality of cables, and/or the cable can be a ribbon cable, with each cable extending preferably through a vehicle door, using power from the door loom.

Further, it is proposed that the interface module comprises at least one connector and/or data exchange device selected from a group comprising an USB connector, a Wifi connector, a Bluetooth connector, an OBD2 connector, infra red device, a wireless network device, wlan device and/or a light device, in particular for emitting laser beams. Still further, the interface module can comprise at least one upgradable interface slot and/or the interface module is connected to or connectable to an infotainment system of the motor vehicle. Such connectors enable the user of the system to connect other electronic devices, such as smart phones, tablets, computers and the like to the system. The modular peripheral device can be updated this way. Furthermore, this allows for the modular peripheral device to interact with programs or apps on such electronic device. The OBD2 connector further enables the connection of diagnostic hardware to the interface device at an easily reachable position. In particular an OBD2 miniature standard port (TBA) will facilitate vehicle diagnostics. The USB connector can be suited for a USB2/3/C socket enabling the connection to any electronic device, in particular for interfacing with an infotainment system of the vehicle or as a charging outlet. In case the interface module is WiFi enabled, an indication of the strength of the Wifi signal as well as Wifi availably, for example linked via an app, can be displayed. Even a Wifi hotspot detection becomes possible.

The camera pod and/or the interface module can be adapted to be moveable, in particular in the direction of a lateral axis of the motor vehicle. This allows for positioning e.g. the camera pod and the associated modular peripheral devices to adapt for the configuration of the vehicle. For example, if the motor vehicle is towing a wide-body trailer, it can be advantageous to move the camera pod laterally further away from the motor vehicle's body in order to improve the field of view of the camera or of any mounted modular peripheral device.

In addition, the camera pod can comprises a lens cleaning system and/or a protective cover for the camera. In this manner, it can be assured that the camera is protected from environmental influences or damages and that the picture produced by the camera is always clear regardless of weather conditions.

In a further preferred embodiment of the invention, the interface module is connectable to an infotainment system of the motor vehicle. This allows for transfer of commands to the modular peripheral devices via the usual user interfaces of the vehicle and to receive data from the modular peripheral device, which can, for example, be displayed on a screen on the dashboard. Moreover, such a connection allows to provide updates and new software to the modular peripheral device via the infotainment system.

In a further preferred embodiment of the invention, the interface module comprises at least one upgradable interface slot. Such a slot can for example receive modules for new connector types, so that the system can easily be adapted to new standards.

In another aspect, a rear view device and a motor vehicle include at least one module system as described above.

The connecting mechanism of the module system, in particular the locking element thereof, can be integrated with the motor vehicle's general locking mechanism, in particular comprising a central locking system and/or a key system. The exterior surface of the motor vehicle, to which the camera pod is mounted, can be provided by a door of the vehicle. The interface module can be connected to the camera pod via at least one cable, with the cable preferably extending through the vehicle door and/or being connected a door loom.

The camera pod and/or the interface module can be customized to allow for different colors, finishes and the like.

BRIEF DESCRIPTION OF THE DRAWINGS

In the following, the invention and its embodiments are explained in details with reference to the drawings, which show in.

DETAILED DESCRIPTION

Figure 1:
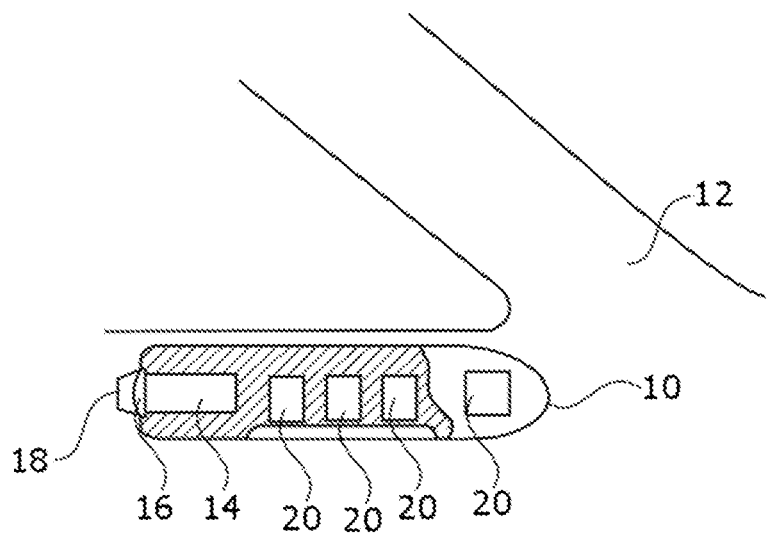
FIG. 1 is a schematic view of a camera pod for an embodiment of the system according to the invention.
Figure 8:
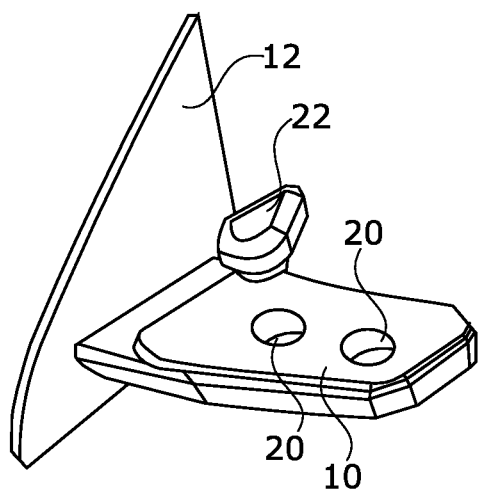
FIG. 8 is a schematic perspective view of a camera pod for an embodiment of the system according to the invention, during the attachment of a peripheral device.
Figure 9:
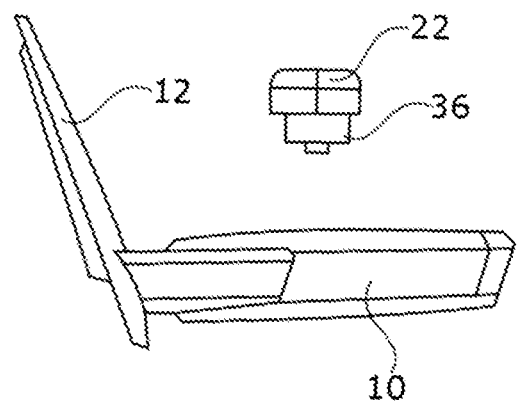
FIG. 9 is a schematic side view of a camera pod for an embodiment of the system according to the invention, during the attachment of a peripheral device.
Figure 10:
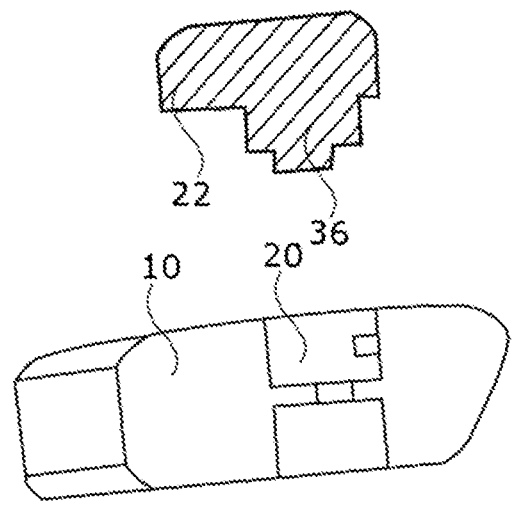
FIG. 10 is a schematic cross-section view of a camera pod for an embodiment of the system according to the invention, during the attachment of a peripheral device.

A camera pod 10 as shown in FIG. 1 is mounted to an outer door surface 12 of a motor vehicle. The camera pod 10 comprises an integrated camera 14 with a lens 16 and a protective lens cover 18. Furthermore, the camera pod 10 comprises a plurality of module ports 20, which are adapted to receive modular peripheral devices 22, with exemplified modular peripheral devices 22 being shown FIGS. 8 to 10.

The peripheral devices 22 can fulfill a multitude of roles and can be selected from the following group:

A microphone, a taxi free lamp, a parking light, a parking disc, a device for providing electronic parking tickets, an automatic toll payment, a logo lamp, a puddle light, a brake light, a side turn indicator light, a spot light, a search light, a welcome/goodbye lamp, a laser, a laser scanner, a projector, an ultrasound sensor, an electronic payment device, an electronic registration device, an antenna, a camera, in particular a bird view camera, a front view camera or a rear view camera, a smart phone, a table, a smart phone multi interface adapter, a protective glass in particular in different colors, a module housing, in particular a lighted module housing, an anti-marten protection system, a dynamic TLS (transport layer security) adapter, an alarm device and the like.

The module ports 20 preferably provide a standardized connection for the peripheral devices 22 in order to function as an universal interface. This comprises a connecting mechanism for mechanically and electrically connecting the modular peripheral devices 22 to the camera pod 10. In this manner, the modular peripheral device can be secured to the camera pod while the electrical connection is established at the same time.

Furthermore, the connecting mechanism preferably comprises at least one plug and/or electrical contact surface and/or inductive contact device. This allows for an easy electrical connection to the modular peripheral device, providing electrical power as well as electrical control signals to the device. For example, the modular peripheral device can connect to a bus system of the motor vehicle in this manner, such as a CAN-bus, a LIN-bus, a FLEXRAY-bus or a MOST-bus. A data transfer can be achieved in a multitude of ways, with or without wires, for example via USB (universal serial bus), Bluetooth, infra red, Wlan, light, in particular with laser beams and many more data transfer methods.

Preferably, the connecting mechanism comprises at least one mechanical connecting element, in particular selected from:

A bayonet mount, a notch connector, a magnetic connector, a dovetail joint, a snap connection element, a pin and/or a bolt connector, a screw connector and/or a spring connector.

Of particular advantage is the combination of the connecting mechanism with a locking mechanism, in particular selected from:

A mechanical lock, a fingerprint actuated lock, an iris scanner actuated lock, a voice recognition lock, a code lock, a smart lock, a key lock, a snap lock, an actuator driven lock, a SMA (shape memory alloy) lock and the like.

The locking mechanism itself comprises at least one mechanical locking element in particular selected from:

A bolt, a snap-lock, a latching element, an undercut, a smart memory alloy (SMA) actuator, an electrical actuator and the like.

In summary, such a design of the module ports 20 allows for an easy mechanical and electrical connection to the camera pod 10.

Figure 2:
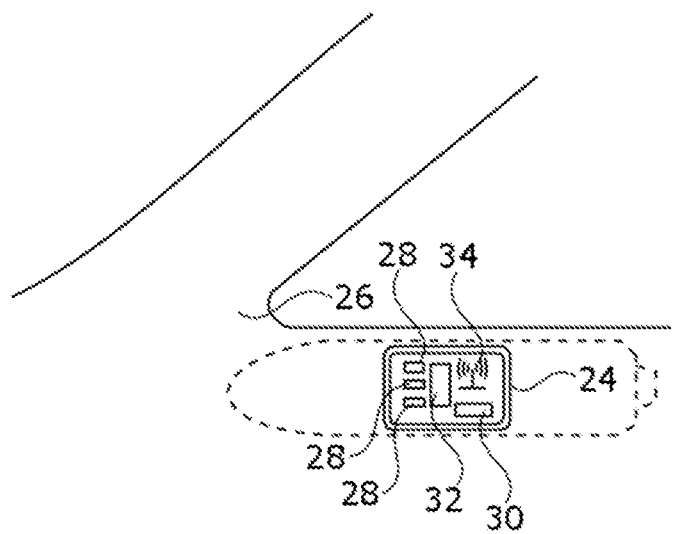
FIG. 2 is a schematic view of an interface module for an embodiment of the system according to the invention.
Figure 3:
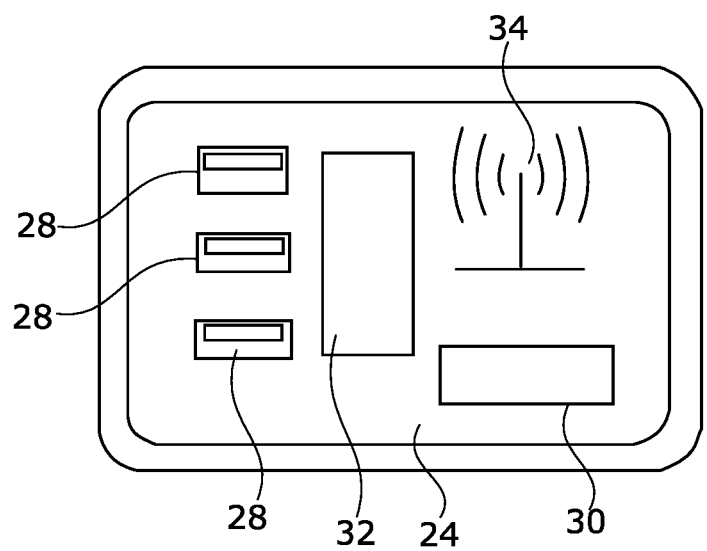
FIG. 3 is a close-up view of the interface module according to FIG. 3.

The camera pod 10 is electrically connected to an interface module 24, which is mounted on an interior surface 26 of the vehicle's door, see FIGS. 2 and 3. Preferably, the interface module 24 is connected to an infotainment system of the vehicle in order to enable transmitting and receiving data to and from the camera pod 10 using the user interface of the vehicle. In addition, the interface module 24 comprises a plurality of USB connectors 28, which enable a user to connect mobile hardware, such as smart phones, tablets, computers or the like to the interface module 24. The mobile device can then be used to issue commands or updates to the camera pod 10 and the attached devices 22. The interface module 24 further comprises an ODB2 (on-board diagnostic) connector 30 for connecting diagnostic hardware to the interface module 24 at an easily reachable position. An empty connector slot 32 is provided to receive future upgrades to new or changed connector standards. The interface module 24 can further comprise a wireless connection device. The signal strength of the wireless connection can be shown via a Wi-Fi symbol 34.

Figure 4:
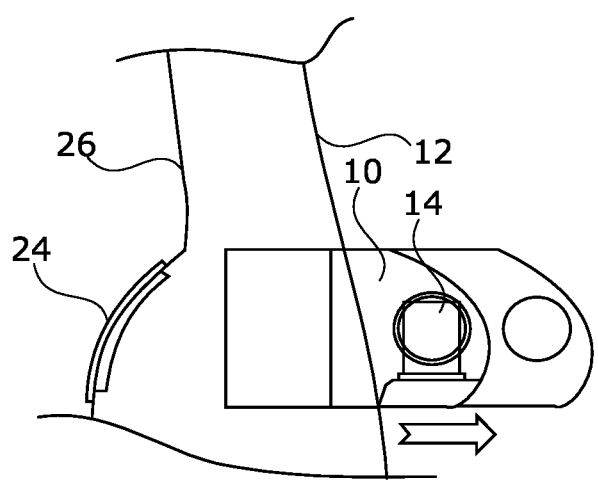
FIG. 4 is a schematic visualization of moving a camera pod for an embodiment of the system according to the invention from a retracted position to an extended position.

As shown in FIG. 4, the camera pod 10 can be moved with respect to the vehicle. The solid lines visualize a retracted position of the camera pod 10, while the dashed lines show an extended position. The movement, being shown to be laterally, can be performed manually or automatically with an appropriate actuator. This allows for the adjustment of the position of the camera 14 or any attached devices 22, for example if a wide trailer is towed by the car.

Figure 5:
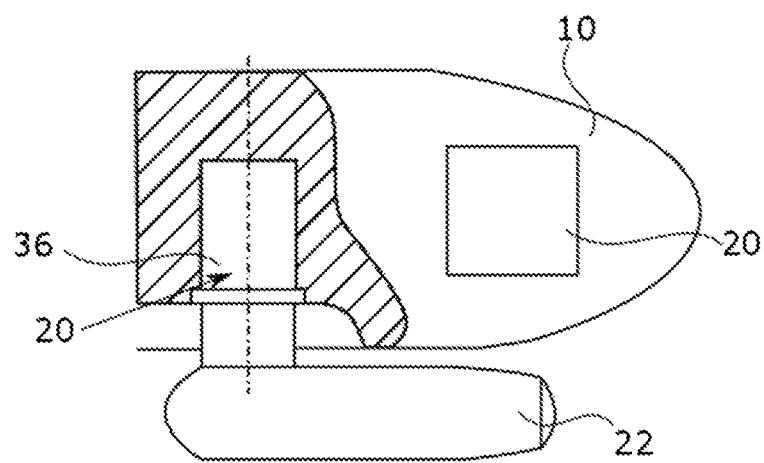
FIG. 5 is a schematic view of a camera pod for an embodiment of the system according to the invention with a mounted additional camera.
Figure 6:
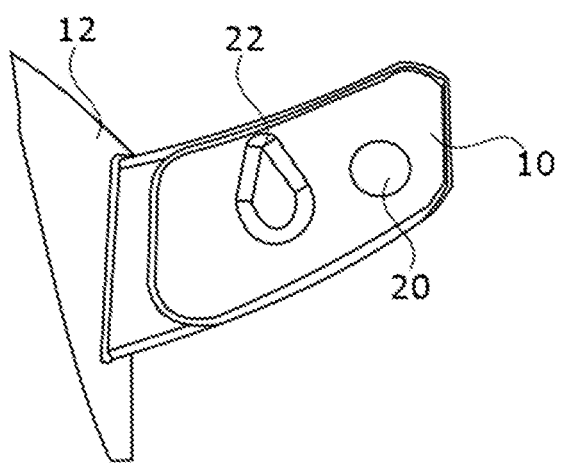
FIG. 6 is a schematic top-side view of a camera pod for an embodiment of the system according to the invention, with an attached peripheral device.
Figure 7:
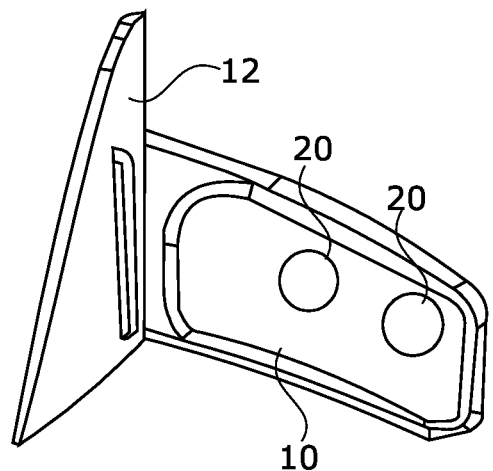
FIG. 7 is a schematic bottom-side view of a camera pod for an embodiment of the system according to the invention, without an attached peripheral device.

FIG. 5 shows a partially cut open view of a camera pod 10 with an attached peripheral device 22 in the form of a secondary camera. As can be seen the device 22 is inserted with a base 36 in the module port 20. The base 36 comprises mechanical and electrical connection means which are complementary to the above-mentioned connectors of the module port 20.

FIGS. 6 to 10 again show a camera pod 10 attached at an outer door surface 12 of a motor vehicle and illustrate the mounting of a peripheral device 22 to a module port 20, in various perspectives.

The features disclosed in this specification, the claims and the figures maybe important for the claimed invention, taken separately or in any combination, for the respective different embodiments.

REFERENCE SIGN LIST

10 camera pod
12 outer door surface
14 camera
16 lens
18 lens cover
20 module port
22 peripheral device
24 interface module
26 interior door surface
28 USB connector
30 ODB2 connector
32 connector slot
34 WiFi symbol
36 base

What is claimed is:

1. A rear view device for a motor vehicle, comprising:
at least one camera pod including at least one camera and at least one port for receiving any one of at least one modular peripheral device or an adapter of at least one modular peripheral device;
at least one interface module electrically connected to the at least one camera pod; and
at least one module system, allowing for a free selection of the at least one modular peripheral device, the module system comprising the at least one camera pod,
wherein the at least one camera pod is adapted to be mounted to the motor vehicle extending at least one of to an outside or from an exterior surface of the motor vehicle,
wherein the at least one camera pod includes the at least one port for electrically connecting one or more of the at least one modular peripheral device or the adapter of the at least one modular peripheral device to the camera pod as a separate device being received from the port with a connecting mechanism,
wherein the at least one interface module is adapted to be mounted to an interior surface of the motor vehicle,
wherein the at least one interface module is connected to the at least one camera pod via at least one cable, the at least one cable extending through a vehicle door and using power from a door loom, and
wherein the at least one interface module allows access to and control of the at least one camera pod including at least one camera and the at least one port for receiving any one of the at least one modular peripheral device or the adapter of at least one modular peripheral device.

2. The rear view device according to claim 1, wherein each port is adapted to receive the at least one modular peripheral device or adapter of the at least one modular peripheral device with the connecting mechanism for connecting the at least one modular peripheral device or adapter of the peripheral device to the camera pod in a lockable and sealed manner.

3. The rear view device according to claim 1, wherein the at least one modular peripheral device or a plurality of adapters is provided with a standardized modular structure.

4. The rear view device according to claim 1, wherein the at least one peripheral device is selected from a group consisting of: a microphone, a taxi free lamp, a parking light, a parking disc, a device for providing electronic parking tickets, an automatic toll payment, a logo lamp, a puddle light, a brake light, a side turn indicator light, a spot light, a search light, a welcome/goodbye lamp, a fog light, an acceleration light, a flash light, a navigation light, a position light, an emergency light, an approach light, a display, a blind spot light, a warning light, a weather light, a lane change light, a fuel status light, a battery charging light, a laser device, a laser scanner, a projector, an ultrasound sensor, an electronic payment device, an electronic registration device, an antenna, a camera, a bird view camera, a front view camera, a rear view camera, a smart phone, a tablet, a smart phone multi interface adapter, a protective glass in particular in different colors, a lighted module housing, an anti-marten protection system, a dynamic TLS (transport layer security) adapter, a scan device, self-park assist device, an adapter to an external power source, and an alarm device.

5. The rear view device according to claim 2, wherein the connecting mechanism comprises at least one mechanical connecting element selected from a group consisting of: a bayonet mount, a notch connector, a magnetic connector, a dovetail joint, a snap connection element, a pin or a bolt connector, a screw connector or a spring connector, a latching element, or and an undercut.

6. The rear view device according to claim 2, wherein the connecting mechanism comprises at least one locking element selected from a group consisting of: a mechanical lock, a fingerprint actuated lock, an iris scanner actuated lock, a code lock, a voice recognition lock, a smart lock, a key lock, a snap lock, an actuator driven lock, a SMA (shape memory alloy), a SMA actuator lock and an electrical actuator lock.

7. The rear view device according to claim 1, wherein at least one of:
the at least one interface module is mounted on an interior surface of the motor vehicle, or
the at least one interface module is connected to the camera pod via at least one cable.

8. The rear view device according to claim 1, wherein the at least one interface module comprises one or more of at least one connector or data exchange device selected from a group consisting of: an USB connector, a Wifi connector, a Bluetooth connector, an OBD2 connector, an infrared device, a wireless network device, wlan device, and a light device for emitting laser beams.

9. The rear view device according to claim 1, wherein at least one of:
the at least one interface module comprises at least one upgradable interface slot, or
the at least one interface module is connected to or connectable to an infotainment system of the motor vehicle.

10. The rear view device according to claim 1, wherein one or more of the camera pod or the at least one interface module is adapted to be moveable in the direction of a lateral axis of the motor vehicle.

11. The rear view device according to claim 1, wherein the camera pod comprises one or more of a lens cleaning system or a protective cover for the camera.

12. A motor vehicle, comprising:
at least one exterior rear view device, comprising:
- at least one camera pod including at least one camera and at least one port for receiving any one of at least one modular peripheral device or an adapter of at least one modular peripheral device;
- at least one interface module being electrically connected to the at least one camera pod; and
- at least one module system, allowing for a free selection of the at least one modular peripheral device, the module system comprising the at least one camera pod,
wherein the at least one camera pod is adapted to be mounted to the motor vehicle extending at least one of to an outside or from an exterior surface of the motor vehicle,
wherein the at least one camera pod including the at least one port for electrically connecting one or more of the at least one modular peripheral device or the adapter of the peripheral device to the camera pod as a separate device being received from the port with a connecting mechanism, and
wherein the at least one interface module is adapted to be mounted to an interior surface of the motor vehicle,
wherein the at least one interface module is connected to the at least one camera pod via at least one cable, the at least one cable extending through a vehicle door and using power from a door loom, and
wherein the at least one interface module allows access to and control of the at least one camera pod including at least one camera and the at least one port for receiving any one of the at least one modular peripheral device, or the adapter of at least one modular peripheral device.

13. The motor vehicle according to claim 12, further comprising a connecting mechanism for connecting the at least one modular peripheral device or the adapter of the peripheral device to the camera pod, wherein the connecting mechanism comprises a locking element, and wherein the connecting mechanism or the locking element thereof can be integrated with the motor vehicle's general locking mechanism comprising one or more of a central locking system or a key system.

14. The motor vehicle according to claim 12, wherein the exterior surface of the motor vehicle to which the camera pod is mounted is comprised by the vehicle door.

* * * * *